(12) United States Patent
Sasaki et al.

(10) Patent No.: US 12,009,543 B2
(45) Date of Patent: Jun. 11, 2024

(54) VALVE DEVICE, STORAGE BODY, POWER STORAGE DEVICE, AND METHOD FOR ATTACHING VALVE DEVICE

(71) Applicant: DAI NIPPON PRINTING CO., LTD., Tokyo (JP)

(72) Inventors: Miho Sasaki, Tokyo (JP); Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 619 days.

(21) Appl. No.: 17/270,321

(22) PCT Filed: Aug. 20, 2019

(86) PCT No.: PCT/JP2019/032389
§ 371 (c)(1),
(2) Date: Feb. 22, 2021

(87) PCT Pub. No.: WO2020/040119
PCT Pub. Date: Feb. 27, 2020

(65) Prior Publication Data
US 2021/0249730 A1 Aug. 12, 2021

(30) Foreign Application Priority Data
Aug. 20, 2018 (JP) .................. 2018-153842

(51) Int. Cl.
*H01M 50/325* (2021.01)
*F16K 27/02* (2006.01)
(Continued)

(52) U.S. Cl.
CPC ....... *H01M 50/325* (2021.01); *F16K 27/0209* (2013.01); *H01M 10/0525* (2013.01);
(Continued)

(58) Field of Classification Search
CPC ............. H01M 50/325; H01M 50/186; H01M 50/105; H01M 50/103
See application file for complete search history.

(56) References Cited

U.S. PATENT DOCUMENTS

| | | | |
|---|---|---|---|
| 6,039,301 A | 3/2000 | Westerhof | |
| 2005/0069759 A1* | 3/2005 | Shimamura | H01M 50/317 429/61 |

(Continued)

FOREIGN PATENT DOCUMENTS

| | | |
|---|---|---|
| EP | 3 650 367 A1 | 5/2020 |
| JP | S59-215825 A | 12/1984 |

(Continued)

OTHER PUBLICATIONS

Mar. 22, 2023 Office Action issued in Chinese Patent Application No. 201980054954.1.

(Continued)

*Primary Examiner* — Olatunji A Godo
(74) *Attorney, Agent, or Firm* — Oliff PLC (57) ABSTRACT

A valve device is a valve device for attaching to a storage body. This valve device is provided with a valve device main body and an adhesive member. The valve device main body is configured to reduce pressure inside the storage body in the case where the pressure increases due to gas produced inside the storage body. The adhesive member is adhered to an outer periphery of the valve device main body, and is configured to adhere to the storage body. A hole through which the gas passes is formed in an end face of the valve device main body.

11 Claims, 10 Drawing Sheets

(51) Int. Cl.
  *H01M 10/0525* (2010.01)
  *H01M 50/103* (2021.01)
  *H01M 50/105* (2021.01)
  *H01M 50/186* (2021.01)
  *F16K 17/04* (2006.01)

(52) U.S. Cl.
  CPC ....... *H01M 50/103* (2021.01); *H01M 50/105* (2021.01); *H01M 50/186* (2021.01); *F16K 17/0406* (2013.01)

(56) References Cited

U.S. PATENT DOCUMENTS

| | | |
|---|---|---|
| 2009/0081542 A1 | 3/2009 | Yageta et al. |
| 2012/0318459 A1 | 12/2012 | Kobayashi |
| 2014/0120387 A1 | 5/2014 | Kinuta et al. |
| 2016/0036024 A1 | 2/2016 | Choi et al. |

FOREIGN PATENT DOCUMENTS

| | | |
|---|---|---|
| JP | H08-80973 A | 3/1996 |
| JP | 2000-513077 A | 10/2000 |
| JP | 2001-288440 A | 10/2001 |
| JP | 2004-268298 A | 9/2004 |
| JP | 2006-107894 A | 4/2006 |
| JP | 2006-179442 A | 7/2006 |
| JP | 2009-16549 A | 1/2009 |
| JP | 2009-99527 A | 5/2009 |
| JP | 2011-168005 A | 9/2011 |
| JP | 2014-110114 A | 6/2014 |
| JP | 2016-031934 A | 3/2016 |
| JP | 6359731 B1 | 7/2018 |
| WO | 2006/098242 A1 | 9/2006 |
| WO | 2011/102283 A1 | 8/2011 |
| WO | 2013/146803 A1 | 10/2013 |

OTHER PUBLICATIONS

Jun. 14, 2022 Office Action issued in Japanese Patent Application No. 2019-232225.
Oct. 6, 2020 Office Action issued in Japanese Patent Application No. 2020-046035.
Nov. 20, 2018 Office Action issued in Japanese Patent Application No. 2018-198413.
Feb. 12, 2019 Office Action issued in Japanese Patent Application No. 2018-198413.
Jul. 16, 2019 Office Action issued in Japanese Patent Application No. 2018-198413.
Nov. 5, 2019 Search Report issued in International Patent Application No. PCT/JP2019/032389.
Nov. 5, 2019 Written Opinion of the International Searching Authority issued in International Patent Application No. PCT/JP2019/032389.

* cited by examiner

VALVE DEVICE, STORAGE BODY, POWER STORAGE DEVICE, AND METHOD FOR ATTACHING VALVE DEVICE

TECHNICAL FIELD

The present invention relates to a valve device, a storage body, a power storage device, and a method for attaching the valve device.

BACKGROUND ART

JP 6359731 (Patent Literature 1) discloses a shutoff valve for a bag. This bag shutoff valve is for attaching to a sealed bag. Specifically, this bag shutoff valve is attached to a sealed bag, due to heat sealing (thermal sealing) being performed with this bag shutoff valve sandwiched in the sealed bag (see Patent Literature 1).

CITATION LIST

Patent Literature
Patent Literature 1: JP 6359731

SUMMARY OF INVENTION

Technical Problem

The bag shutoff valve (valve device) that is disclosed by Patent Literature 1 is made of synthetic resin. However, depending on the combination of the material of the bag shutoff valve and the inner layer material of the bag, the shapes thereof and other such factors, there is a possibility of not being able to attach the bag shutoff valve to the sealed bag (storage body) by heat sealing.

The present invention has been made in order to solve the problem of attaching a valve device to such a storage body, and provides a valve device having excellent adhesiveness to a storage body, a storage body including the valve device, a power storage device, and a method for attaching the valve device.

Solution to Problem

A valve device according to an aspect of the present invention is a valve device for attaching to a storage body. This valve device is provided with a valve device main body and an adhesive member. The valve device main body is configured to reduce pressure inside the storage body in the case where the pressure increases due to gas produced inside the storage body. The adhesive member is adhered to an outer periphery of the valve device main body, and is configured to adhere to the storage body. A hole through which the gas passes is formed in an end face of the valve device main body.

In this valve device, an adhesive member adherable to the storage body is adhered in advance to the outer periphery of the valve device main body. Accordingly, with this valve device, the storage body and the valve device can be easily adhered, irrespective of the material of the valve device main body.

In the above valve device, the valve device main body may be made of metal.

In order to directly adhere the valve device main body and the storage body in the case where the valve device main body is made of metal, a material having adhesiveness with the metal constituting the valve device main body needs to be employed as a heat-sealable resin layer constituting the inner layer of the storage body. However, the heat-sealable resin layer constituting the inner layer of the storage body achieves the function of sealing the storage body due to heat-sealable resin layers welding to each other. Selection of the material, that is, restriction of the material, for directly adhering the valve device main body and the storage body may also have an undesirable effect on various conditions of the thermal sealing, such as pressure, temperature and time, for achieving a complete seal through the welding of heat-sealable resin layers. Accordingly, assuming that sealing the storage body is the first priority, directly adhering the valve device main body and the storage body is not desirable in terms of narrowing the breadth of material selection and the breadth of design of the heat-sealable resin layer.

In contrast, with the valve device according to the present invention, an adhesive member is adhered in advance to the outer periphery of the valve device main body. Accordingly, with this valve device, the storage body and the valve device can be easily adhered, even when the valve device main body is made of metal, by appropriately selecting a material having adhesiveness with the heat-sealable resin layer serving as the inner layer of the storage body and having adhesiveness with the metal constituting the valve device main body as the material of the adhesive member, and thus there is no narrowing of the breadth of material selection for the heat-sealable resin layer compared with the case of direct adhesion mentioned above.

Also, as the method for disposing the adhesive member between the valve device main body and the storage body, a method for thermally sealing the storage body, the adhesive member and the valve device main body at the same time is conceivable, for example. However, in the case where the valve device main body is made of metal, heat dissipation of the valve device main body is high, and thus, even when thermal sealing is performed at the same time, a situation can arise where the storage body and the adhesive member adhere but the valve device main body and the adhesive member do not adhere. In the valve device according to the present invention, the adhesive member is adhered in advance to the valve device main body. Accordingly, with this valve device, situations such as the above can be avoided.

In the above valve device, the adhesive member may be in film form.

The adhesive member, in film form, can be wound into a roll shape to form a rolled body of the adhesive member. In this case, the rolled body of the adhesive member can be unrolled and cut to a predetermined length, and the cut adhesive member can be adhered to the valve device main body prepared separately by being extended along or wrapped around the outer periphery thereof, enabling the task of attaching the adhesive member to the valve device main body to be efficiently performed.

Also, in the above valve device, at least part of the region of the outer periphery of the valve device main body where the adhesive member is adhered may be curved.

In the case where at least part of the outer periphery of the valve device main body is curved, adhering the adhesive member to the outer periphery of the valve device main body is difficult, compared with the case where the outer periphery of the valve device main body is flat. In the valve device according to the present invention, the adhesive member is adhered in advance to the outer periphery of the valve device main body. Accordingly, with this valve device, a situation where the adhesive member does not adhere to the valve device main body at the time of thermal sealing does not occur, unlike the case of thermally sealing the storage body, the adhesive member and the valve device main body at the same time, for example.

Also, in the above valve device, the adhesive member may include a core.

This valve device is attachable to the storage body (e.g., storage body for pouch lithium-ion battery) inside of which the insulation quality needs to be maintained. In this case, in order to further strengthen the seal in the vicinity of the valve device, there is the possibility of thermal sealing being performed a plurality of times in the vicinity of the valve device. Supposing the adhesive member did not include a core, there is a possibility of the adhesive member and the heat-sealable resin layer constituting the inner layer of the storage body melting due to the heat and pressure and being pushed out into low pressure portions when thermal sealing is repeatedly performed. As a result, there is a possibility of the insulating layers (adhesive member and heat-sealable resin layer constituting the inner layer of the storage body) breaking down where the valve device is sandwiched inside the storage body, and a short circuit occurring inside the storage body, due to a layer of metallic foil such as aluminum foil constituting a barrier layer of the storage body short circuiting with the valve device main body that is constituted by metal. In the valve device according to the present invention, the adhesive member includes a core. Accordingly, with this valve device, the adhesive member including the core suppresses breaking down of the insulating layers, thus enabling the insulation quality inside the storage body to be maintained, even when thermal sealing is performed a plurality of times in the vicinity of the valve device.

Also, in plan view, the length of the adhesive member in the width direction may be configured to be longer than the length of the region of the valve device main body where the adhesive member is adhered in the width direction.

That is, in this valve device, the adhesive member extends over a range greater than or equal to once round the outer periphery of the valve device main body. Accordingly, with this valve device, the adhesive member is disposed over a wide range, thus enabling the valve device and the storage body to be adhered more reliably.

Also, a hole for releasing gas produced inside the storage body may be formed in the valve device main body, and the adhesive member may be adhered to the outer periphery of the valve device main body in a position that does not cover the hole.

Also, the valve device main body may include a first portion inside of which is formed a valve mechanism for reducing the pressure inside the storage body in the case where the pressure increases due to gas produced inside the storage body and a second portion inside of which is formed a ventilation passage for directing gas produced inside the storage body to the valve mechanism, and a step may be formed at the boundary between the first portion and the second portion.

Also, the cross-sectional shape of the region of the valve device main body where the adhesive member is adhered may be a teary eye shape having a circular part and a wing-like protruding end part extending from both horizontal ends of the circular part.

Also, a storage body according to another aspect of the present invention is provided with the above valve device.

Also, a power storage device according to another aspect of the present invention is provided with a battery element, a storage body, and a valve device. The storage body accommodates the battery element. The valve device is attached to the storage body. The valve device includes a valve device main body and an adhesive member. The valve device main body is configured to reduce pressure inside the storage body in a case where the pressure increases due to gas produced inside the storage body. The adhesive member is adhered to an outer periphery of the valve device main body, and is adhered to the storage body. A hole through which the gas passes is formed in an end face of the valve device main body.

Also, a method for attaching a valve device according to another aspect of the present invention is a method for attaching a valve device to a storage body. The valve device includes a valve device main body and an adhesive member. The valve device main body is configured to reduce pressure inside the storage body in a case where the pressure increases due to gas produced inside the storage body. The adhesive member is adhered to an outer periphery of the valve device main body, and is configured to adhere to the storage body. A hole through which the gas passes is formed in an end face of the valve device main body. The valve device attachment method includes the steps of sandwiching the valve device with the storage body, and thermally sealing a region of the storage body where the valve device is sandwiched.

With the valve device that is used in this attachment method, the adhesive member is adhered in advance to the outer periphery of the valve device main body. Accordingly, with this method for attaching the valve device, the storage body and the valve device can be easily adhered by thermal sealing, regardless of the material of the valve device main body.

Advantageous Effects of Invention

According to the present invention, a valve device having excellent adhesiveness with a storage body, a storage body including this valve device, a power storage device, and a method for attaching this valve device can be provided.

DESCRIPTION OF EMBODIMENTS

Hereinafter, embodiments of the present invention will be described in detail, with reference to the drawings. Note that the same reference signs are given to portions that are the same or equivalent in the drawings, and description thereof will not be repeated.

1. First Embodiment

1-1. Outline

Figure 1:
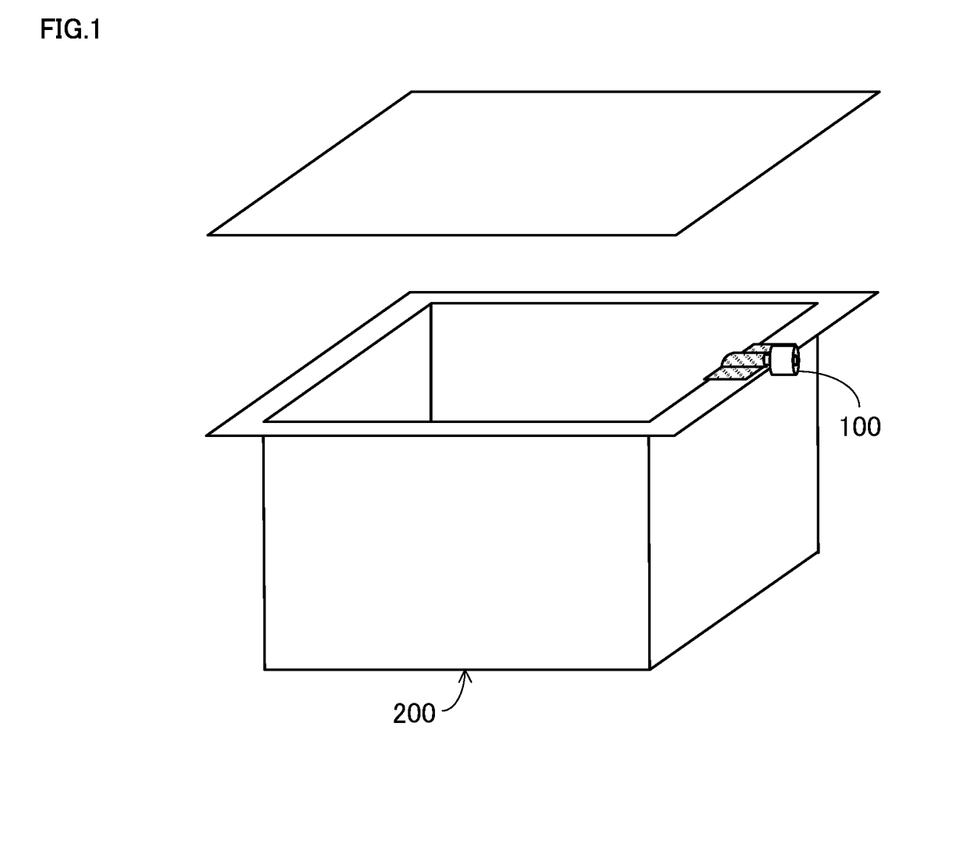
FIG. 1 is a perspective view showing a valve device and a storage body to which the valve device is attached.

FIG. 1 is a perspective view showing a valve device 100 according to the present embodiment and a storage body 200 to which the valve device 100 is attached. As shown in FIG. 1, the valve device 100 is attached to the storage body 200, for example.

The storage body 200 is created by, for example, molding a laminate (laminate film) having a base material layer, a barrier layer and a heat-sealable resin layer in this order. The storage body 200 is configured to store coffee, fermented foodstuff (bean paste, etc.), medicine and secondary batteries (lithium-ion batteries, etc.), for example. The item stored in the storage body 200 produces gas over time, for example. Note that, as for the barrier layer, a metallic foil layer, or more specifically, an aluminum foil layer, is commonly employed due to the excellent barrier function and cost. For example, a laminated battery is constituted when battery elements (including condensers, capacitors, etc.) such as lithium-ion batteries are stored in the storage body 200. Note that a laminated battery in which secondary batteries such as lithium-ion batteries are stored is an example of a power storage device, and either primary batteries or secondary batteries may be stored in the storage body 200. Preferably, secondary batteries are stored in the storage body 200. The type of secondary battery that is stored in the storage body 200 is not particularly restricted, and a lithium-ion battery, a lithium-ion polymer battery, an all-solid battery, a lead battery, a nickel-hydride battery, a nickel-cadmium battery, a nickel-iron battery, a nickel-zinc battery, a silver oxide-zinc battery, a metal air cell, a polyvalent cation battery, a condenser and a capacitor are given as examples.

The valve device 100 is configured to communicate with the inside of the storage body 200, and is, for example, configured to reduce pressure inside the storage body 200 in the case where the pressure reaches a predetermined pressure due to gas produced inside the storage body 200. The valve device 100 includes therein a mechanism that realizes a so-called return valve, breaker valve, permselective valve or other such valve. The valve device 100 is attached to the storage body 200, by being heat sealed (thermally sealed) in a state where the valve device 100 is sandwiched in the storage body 200. That is, the adhesive strength between the valve device 100 and the storage body 200 is a strength at which the adhesion between the valve device 100 and the storage body 200 is not broken, even when the pressure inside the storage body 200 reaches a pressure at which the valve mechanism (return valve, breaker valve, permselective valve, etc.) included in the valve device 100 opens.

Generally, it can be difficult to attach a valve device to a storage body by heat sealing, depending on the material of the casing of the valve device. For example, when the valve device has a metal casing, it is difficult to attach the valve device to the storage body by heat sealing. However, with the valve device 100 according to the present embodiment, adhesion of the valve device 100 and the storage body 200 by heat sealing is possible, regardless of the material of the casing. Hereinafter, a configuration and manufacturing method of the valve device 100 and an attachment method of the valve device 100 to the storage body 200 will be described in order.

1-2. Configuration of Valve Device

Figure 2:
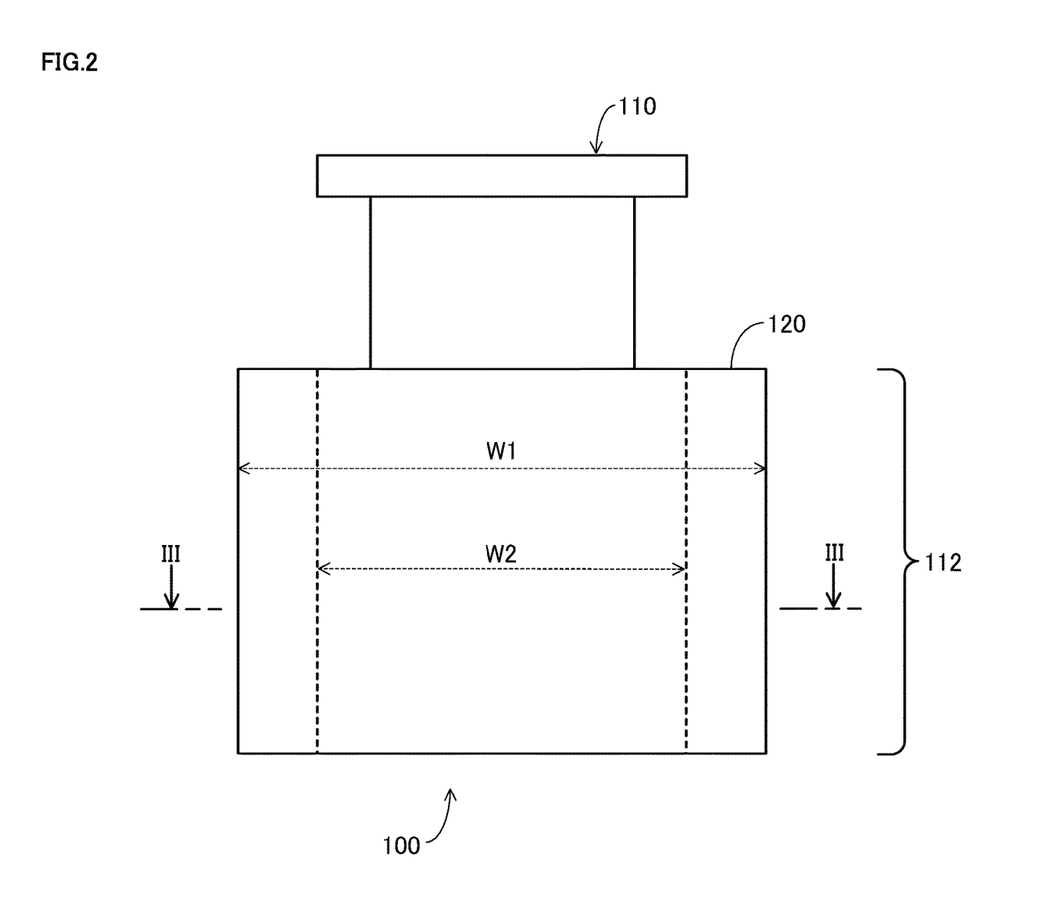
FIG. 2 is a plan view of the valve device according to a first embodiment.
Figure 3:
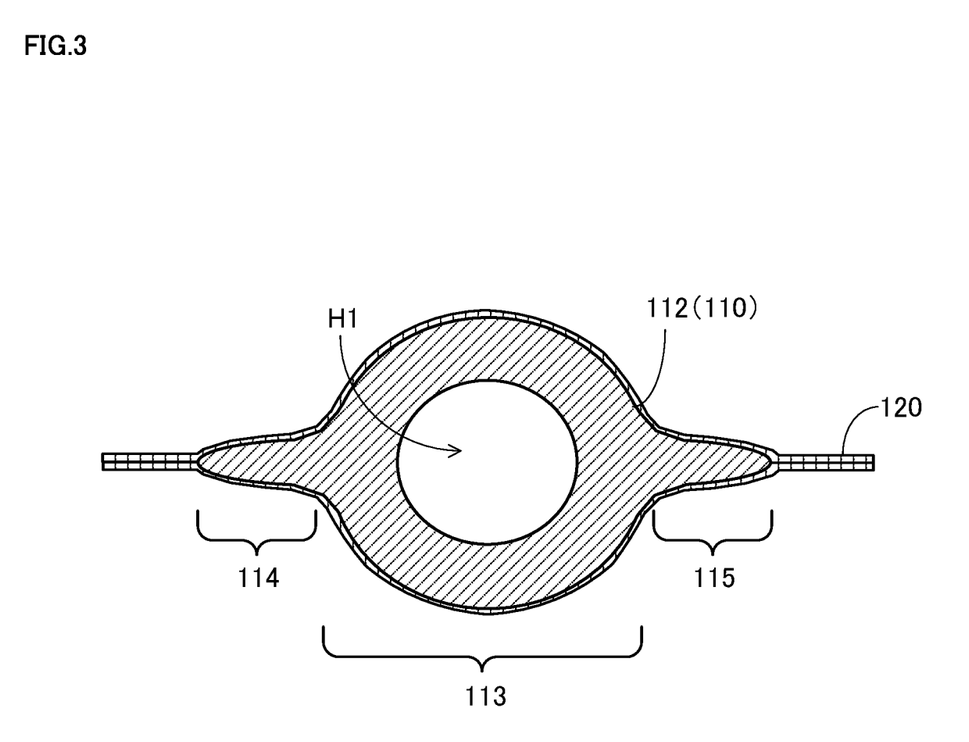
FIG. 3 is a cross-sectional view taken along III-III in FIG. 2.

FIG. 2 is a plan view of the valve device 100. FIG. 3 is a cross-sectional view taken along III-III in FIG. 2. Referring to FIGS. 2 and 3, the valve device 100 includes a valve device main body 110 and an adhesive film 120. That is, in the valve device 100, the adhesive film 120 corresponding to the adhesive member is attached in advance to the valve device main body 110.

The valve device main body 110 is made of metal. The valve device main body 110 is constituted by aluminum, brass, stainless steel or other such metal. The valve device main body 110 includes a mechanism that realizes a so-called return valve, breaker valve, permselective valve or other such valve. A ventilation port H1 is formed on the inside of the valve device main body 110. That is, in the valve device main body 110, a hole through which gas passes is formed in an end face disposed inside the storage body 200. That is, in the case where the valve device 100 is attached to the storage body 200 (FIG. 1), the valve device main body 110 is configured to reduce pressure inside the storage body 200, when the pressure reaches a predetermined pressure due to gas produced inside the storage body 200, by releasing the gas to the exterior of the storage body 200 through the ventilation port H1. Note that the lower end side of the valve device 100 faces inside the storage body 200 when the valve device 100 is attached to the storage body 200.

The adhesive film 120 is configured to adhere to both the valve device main body 110 and the storage body 200 (FIG. 1) by heat sealing. That is, the adhesive strength between the adhesive film 120 and the storage body 200 in the case where the valve device 100 is attached to the storage body 200 is a strength at which the adhesion between the adhesive film 120 and the storage body 200 is not broken, even when the pressure inside the storage body 200 reaches a pressure at which the valve mechanism (return valve, breaker valve, permselective valve, etc.) included in the valve device 100 opens. As for the adhesive film 120, various known adhesive films can be employed. As an example, the adhesive film 120 may be a monolayer film of maleic anhydride-modified polypropylene (PPa), or may be a laminated film having a plurality of layers consisting of a PPa layer, a polyethylene naphthalate (PEN) layer and a PPa layer. Also, a laminated film having a plurality of layers consisting of a PPa layer, a polypropylene (PP) layer and a PPa layer may be applied. Also, instead of the above PPa resin, a metal adherable resin such as an ionomer resin, modified polyethylene or EVA is also applicable.

In the present embodiment, the adhesive film 120 employs a laminated film having a three-layer structure that includes a core, consisting of PPa/PEN (core)/PPa layers. As for the core, various known materials besides PEN mentioned above can be employed. As an example, the core may be polyester fiber, may be polyamide fiber, or may be carbon fiber. The reason for including a core in the adhesive film 120 will be described in detail later.

The adhesive film 120 is adhered to the valve device main body 110 in a state of covering the outer periphery of an adhesion part 112 of the valve device main body 110. The adhesive film 120 is also adhered to the storage body 200 (FIG. 1) as described above, and thus with the valve device 100, the valve device 100 and the storage body 200 can be easily adhered by heat sealing, even when the valve device main body 110 is made of metal. Note that the cross-sectional shape of the adhesion part 112 is a teary eye shape (shape including a circular part 113 and wing-like protruding end parts 114, 115). That is, the entire circumference of the adhesion part 112 has a curved cross-sectional shape. More specifically, since the outer peripheral cross-section of the circular part 113 is a convex curve, and respective end sides of this circular part 113 are connected to the base side of the wing-like protruding end parts 114 and 115 in a gently concave curved outer peripheral cross-section, the adhesive film 120 can be adhered to the outer periphery of the adhesion part 112 of the valve device main body 110 without any gaps.

Also, a length W1 of the adhesive film 120 in the width direction is longer than a length W2 of the adhesion part 112 in the width direction. That is, in the valve device 100, the adhesive film 120 extends over a range greater than or equal to once round the outer periphery of the adhesion part 112 (FIG. 3). Accordingly, with the valve device 100, the adhesive film 120 is disposed over a wide range, thus enabling the valve device 100 and the storage body 200 to be adhered more reliably.

Also, the disposition range of the adhesive film 120 reaches the lower end of the adhesion part 112 (valve device main body 110). The reason for this will be described next. As described above, there is the possibility of a secondary battery being stored in the storage body 200 to which the valve device 100 is attached. In this case, when the adhesion part 112 (metal) is exposed over a wide range, the possibility of an electrode of the secondary battery contacting the adhesion part 112 increases, making a short circuit more likely. In the valve device 100 according to the present embodiment, the disposition range of the adhesive film 120 reaches the lower end of the adhesion part 112. Accordingly, with this valve device 100, the possibility of a short circuit occurring due to the valve device 100 can be reduced, even supposing a secondary battery were stored in the storage body 200. Note that the adhesive film 120 may be disposed so as to protrude beyond the lower end of the adhesion part 112.

1-3. Manufacturing Method of Valve Device

Figure 4:
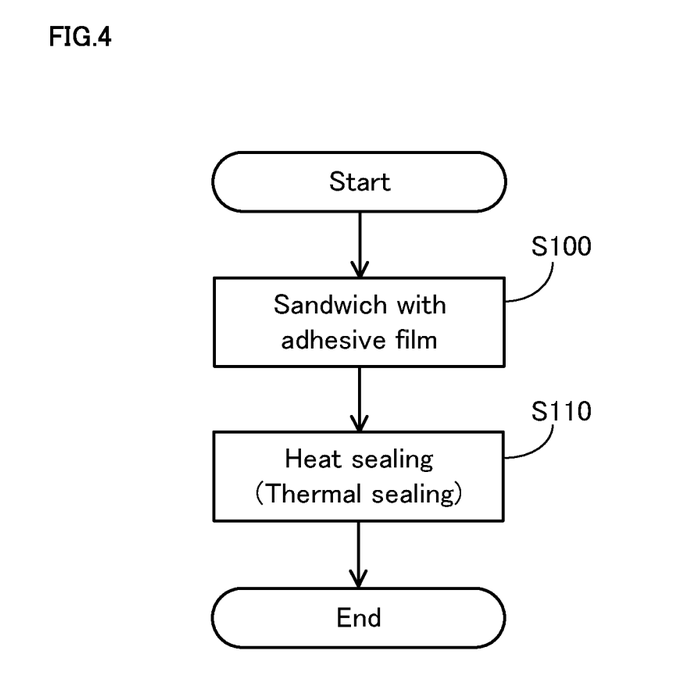
FIG. 4 is a flowchart showing a procedure for manufacturing the valve device.

FIG. 4 is a flowchart showing a procedure for manufacturing the valve device 100. The processing shown in this flowchart is executed by a manufacturing apparatus, for example, in a state where the valve device main body 110 and the adhesive film 120 have been prepared.

Referring to FIG. 4, the manufacturing apparatus sandwiches the adhesion part 112 of the valve device main body 110 with the adhesive film 120 (step S100). The manufacturing apparatus heat seals the adhesive film 120 to the adhesion part 112, in the state where the adhesion part 112 is sandwiched by the adhesive film 120 (step S110). The valve device 100 is thereby completed.

1-4. Attachment Method to Storage Body

Figure 5:
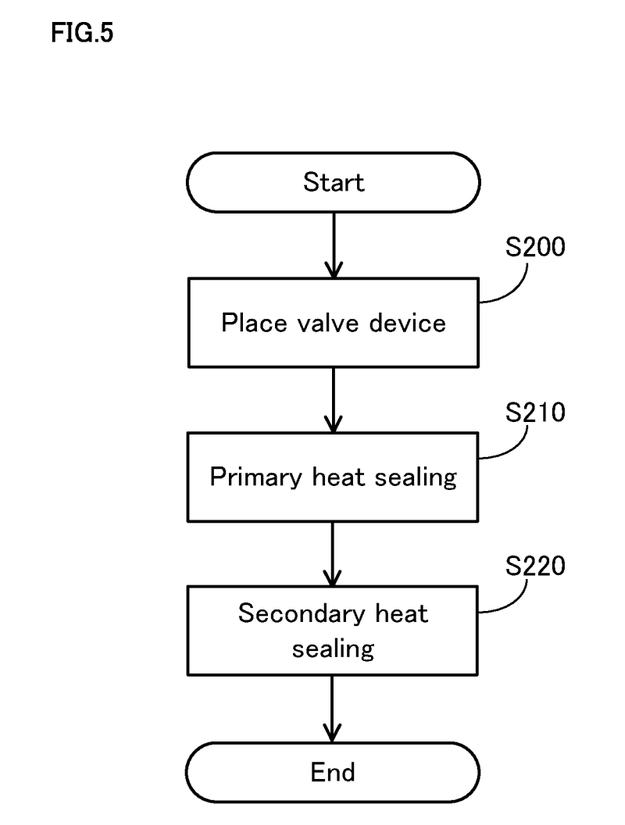
FIG. 5 is a flowchart showing a procedure for attaching the valve device to the storage body.

FIG. 5 is a flowchart showing a procedure for attaching the valve device 100 to the storage body 200. The processing shown in this flowchart is executed by a manufacturing apparatus, for example, in a state where the valve device 100 and the storage body 200 have been prepared. Also, FIG. 6 is a diagram showing a portion of the storage body 200 in a state where the valve device 100 is attached, and FIG. 7 is a cross-sectional view taken along III-III in FIG. 6.

Figure 6:
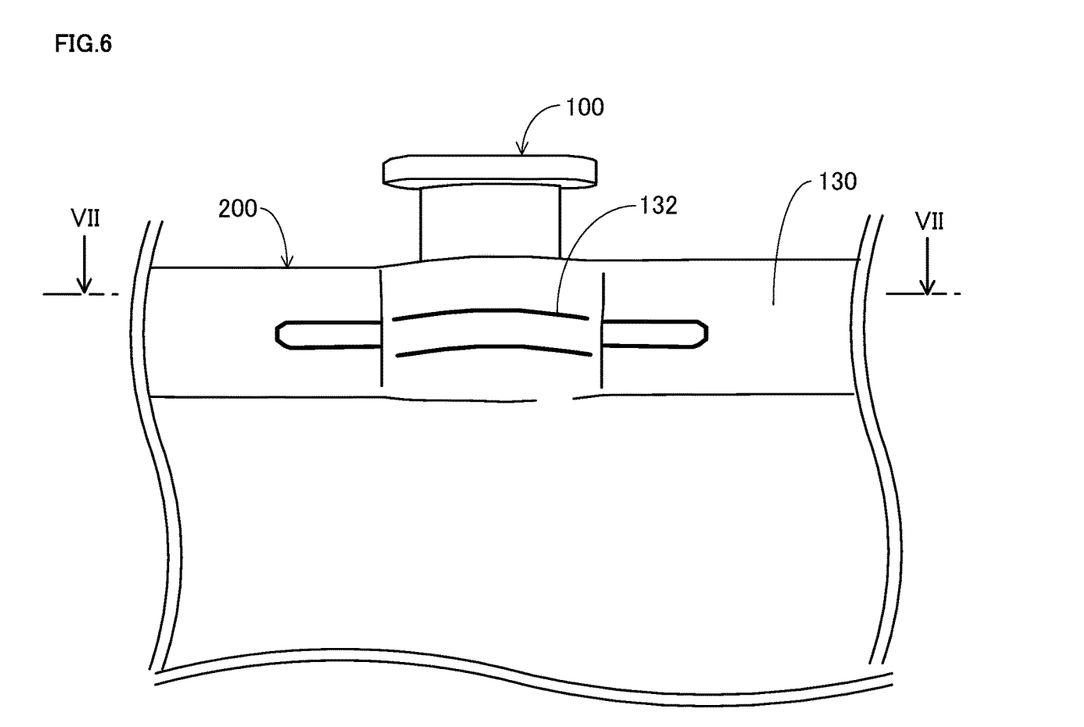
FIG. 6 is a diagram showing a portion of the storage body in a state where the valve device is attached.
Figure 7:
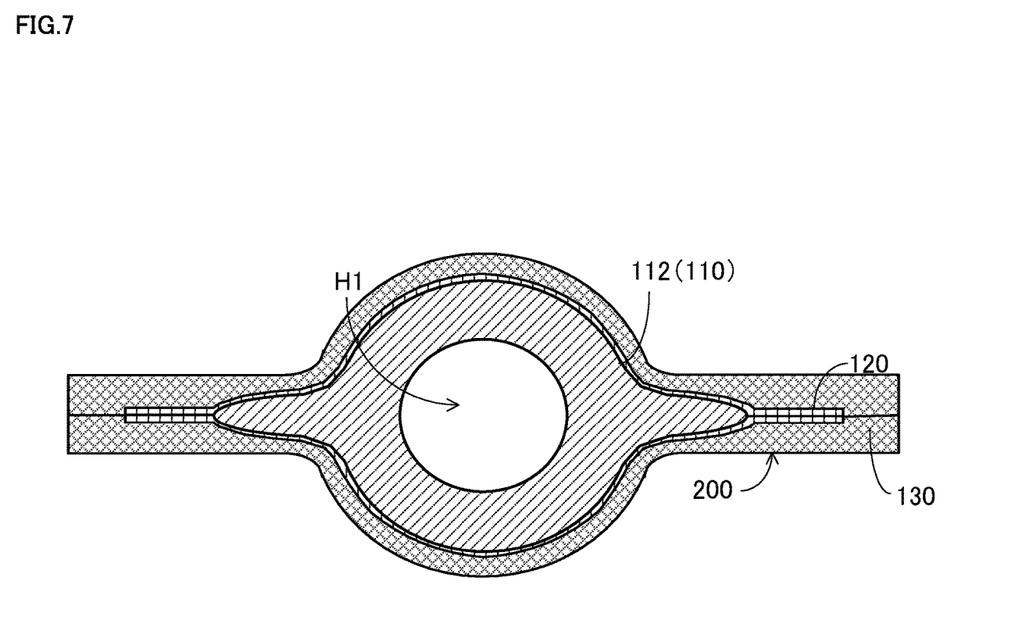
FIG. 7 is a cross-sectional view taken along VII-VII in FIG. 6.

Referring to FIGS. 5, 6 and 7, the manufacturing apparatus places the valve device 100 on the storage body 200 (step S200). For example, the manufacturing apparatus places the valve device 100 on the storage body 200, such that the valve device 100 is sandwiched in a flange part (peripheral edge part) of the storage body 200 (FIG. 1).

The manufacturing apparatus performs a first iteration of heat sealing (primary heat sealing), in a state where the valve device 100 is sandwiched in the flange part of the storage body 200 (step S210). The entire flange part (primary sealed part 130 (FIGS. 6, 7)) of the storage body 200 is thereby heat sealed. Thereafter, the manufacturing apparatus performs a second iteration of heat sealing (secondary heat sealing), in order to further strengthen the seal around the valve device 100 (step S220). The periphery (secondary sealed part 132) of the valve device 100 is thereby heat sealed more strongly. The valve device 100 is thereby attached to the storage body 200.

1-5. Features

As described above, in the valve device 100 according to the present embodiment, the adhesive film 120 adherable to a storage body is adhered in advance to the outer periphery of the valve device main body 110. Accordingly, with this valve device 100, the storage body 200 and the valve device 100 can be easily adhered, regardless of the material of the valve device main body 110.

Also, in the valve device 100 according to the present embodiment, the valve device main body 110 is made of metal. In the case where the valve device main body 110 is made of metal, the material of the heat-sealable resin layer constituting the inner layer of the storage body 200 is restricted, when directly adhering the valve device main body 110 and the storage body 200, and thus achieving both sealability (welding of heat-sealable resin layers) of the storage body 200 and direct adhesion of the storage body 200 and the valve device main body 110 is comparatively difficult. In the valve device 100 according to the present embodiment, the adhesive film 120 is adhered in advance to the outer periphery of the valve device main body 110, and thus the storage body 200 and the valve device 100 can be easily adhered, even when the valve device main body 110 is made of metal, by appropriately selecting a material having adhesiveness with the heat-sealable resin layer serving as the inner layer of the storage body 200 and having adhesiveness with the metal constituting the valve device main body 110 as the material of the adhesive film 120. Accordingly, there is no narrowing of the breadth of material selection or the breadth of design of the heat-sealable resin layer compared with the case of direct adhesion mentioned above.

Also, a method for heat sealing the storage body 200, the adhesive film 120 and the valve device main body 110 at the same time, for example, is conceivable as a method for disposing the adhesive film 120 between the valve device main body 110 and the storage body 200. However, in the case where the valve device main body 110 is made of metal, heat dissipation of the valve device main body 110 is high, and thus, even when thermal sealing is performed at the same time, a situation can arise where the storage body 200 and the adhesive film 120 adhere but the valve device main body 110 and the adhesive film 120 do not adhere. In the valve device 100 according to the present embodiment, the adhesive film 120 is adhered in advance to the valve device main body 110. Accordingly, with this valve device 100, situations such as the above can be avoided.

Also, in the valve device 100 according to the present embodiment, a film-like adhesive member, or specifically, the adhesive film 120, is employed. In the case where the adhesive member is thus in film form, a rolled body of the adhesive film 120 can be manufactured by winding the continuous adhesive film 120 into a roll shape, and the rolled body of the adhesive film 120 can be unrolled and cut to a predetermined length, and the cut adhesive film 120 can be adhered to the valve device main body 110 prepared separately by being extended along or wrapped around the outer periphery thereof. That is, the task of attaching the adhesive member to the valve device main body 110 can be efficiently performed.

Also, in the valve device 100 according to the present embodiment, the outer periphery of the adhesion part 112 is curved. In the case where the outer periphery of the adhesion part 112 is curved, adhering the adhesive film 120 to the outer periphery of the adhesion part 112 is difficult, compared with the case where the outer periphery of the adhesion part 112 is flat. In the valve device 100 according to the present embodiment, the adhesive film 120 is adhered in advance to the outer periphery of the adhesion part 112. Accordingly, with this valve device 100, a situation where the adhesive film 120 does not adhere to the valve device main body 110 at the time of heat sealing does not occur, unlike the case of heat sealing the storage body 200, the adhesive film 120 and the valve device main body 110 at the same time, for example.

Also, in the valve device 100 according to the present embodiment, the adhesive film 120 includes a core. This valve device 100 is attachable to the storage body 200 (e.g., storage body for pouch lithium-ion battery) inside of which the insulation quality needs to be maintained. In the present embodiment, in order to further strengthen the seal in the vicinity of the valve device 100, heat sealing is performed twice in the vicinity of the valve device 100. Supposing the adhesive film 120 did not include a core, there is a possibility of the adhesive member and the heat-sealable resin layer constituting the inner layer of the storage body 200 melting due to the heat and pressure and being pushed out into low pressure portions when heat sealing is repeatedly performed. As a result, there is a possibility of the insulating layers (adhesive member and heat-sealable resin layer constituting the inner layer of the storage body) breaking down where the valve device 100 is sandwiched inside the storage body 200, and a short circuit occurring inside the storage body 200, due to a layer of metallic foil such as aluminum foil constituting a barrier layer of the storage body 200 short circuiting with the valve device main body 110 that is constituted by metal. In the valve device 100 according to the present embodiment, the adhesive film 120 includes a core. Accordingly, with this valve device 100, the adhesive film 120 including the core suppresses breaking down of the insulating layers, thus enabling the insulation quality inside the storage body 200 to be maintained, even when heat sealing is performed two times (a plurality of times) in the vicinity of the valve device 100.

2. Second Embodiment

Figure 8:
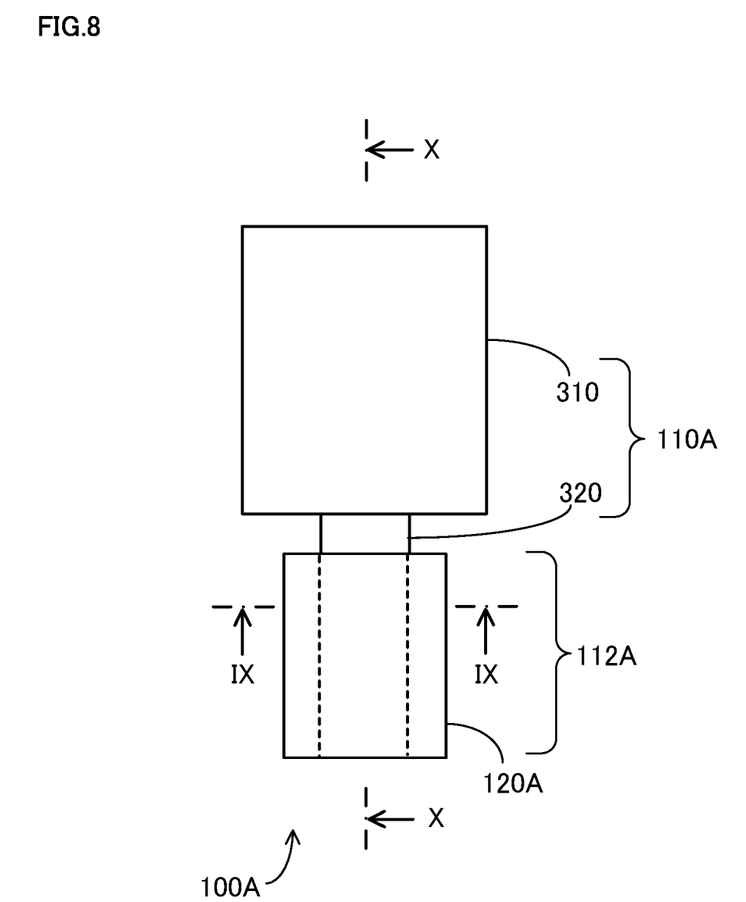
FIG. 8 is a plan view of a valve device according to a second embodiment.

FIG. 8 is a plan view of a valve device 100A according to a second embodiment. As shown in FIG. 8, the valve device 100A includes a valve device main body 110A and an adhesive film 120A. That is, in the valve device 100A, the adhesive film 120A is adhered in advance to the valve device main body 110A.

The valve device main body 110A is constituted by metal, for example, and includes a valve functional part 310 and a seal attachment part 320. An adhesion part 112A is formed in at least part of the seal attachment part 320. That is, the adhesive film 120A is adhered around the adhesion part 112A. The adhesion part 112A is a portion that is sandwiched in the storage body 200 (FIG. 1) and fixed, and the peripheral surface on the outer side of the adhesion part 112A and the heat-sealable resin layer serving as the innermost layer of the storage body 200 melt and are joined via the adhesive film 120A, by being heat sealed.

The adhesive strength between the adhesive film 120A and the storage body 200 in the case where the valve device 100A is attached to the storage body 200 is a strength at which the adhesion between the adhesive film 120A and the storage body 200 is not broken, even when the pressure inside the storage body 200 reaches a pressure at which the valve mechanism (return valve, breaker valve, permselective valve, etc.) included in the valve device 100A opens.

The material and the like of the adhesive film 120A are similar to the adhesive film 120 in the first embodiment, for example. The adhesive film 120A is configured to adhere to both the valve device main body 110A and the storage body 200 by heat sealing, similarly to the adhesive film 120 in the first embodiment.

Figure 9:
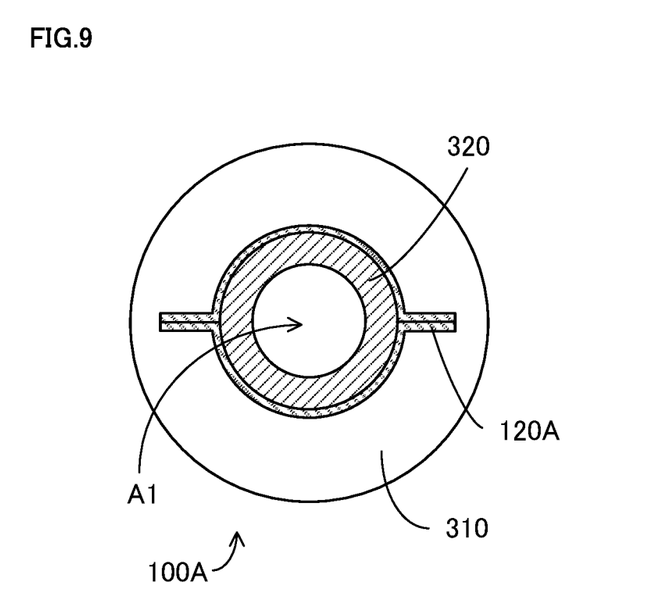
FIG. 9 is a cross-sectional view taken along IX-IX in FIG. 8.

FIG. 9 is a cross-sectional view taken along IX-IX in FIG. 8. As shown in FIG. 9, in the valve device 100A, the respective cross-sections of the valve functional part 310 and the seal attachment part 320 are perfectly circular, and a ventilation passage A1 is formed on the inside of the seal attachment part 320. The cross-section of the ventilation passage A1 is perfectly circular. The adhesive film 120A does not cover the ventilation passage A1. Note that the cross-sectional shape of the seal attachment part 320 need not necessarily be perfectly circular, and may be a teary eye shape such as shown in FIG. 3, for example.

The valve functional part 310 has a longer cross-sectional diameter than the seal attachment part 320. As a result, a step is formed at the boundary between the valve functional part 310 and the seal attachment part 320 (FIG. 8). Since the seal attachment part 320 has a shorter diameter, sealability in the case where the valve device 100A is attached to the storage body 200 is enhanced.

Figure 10:
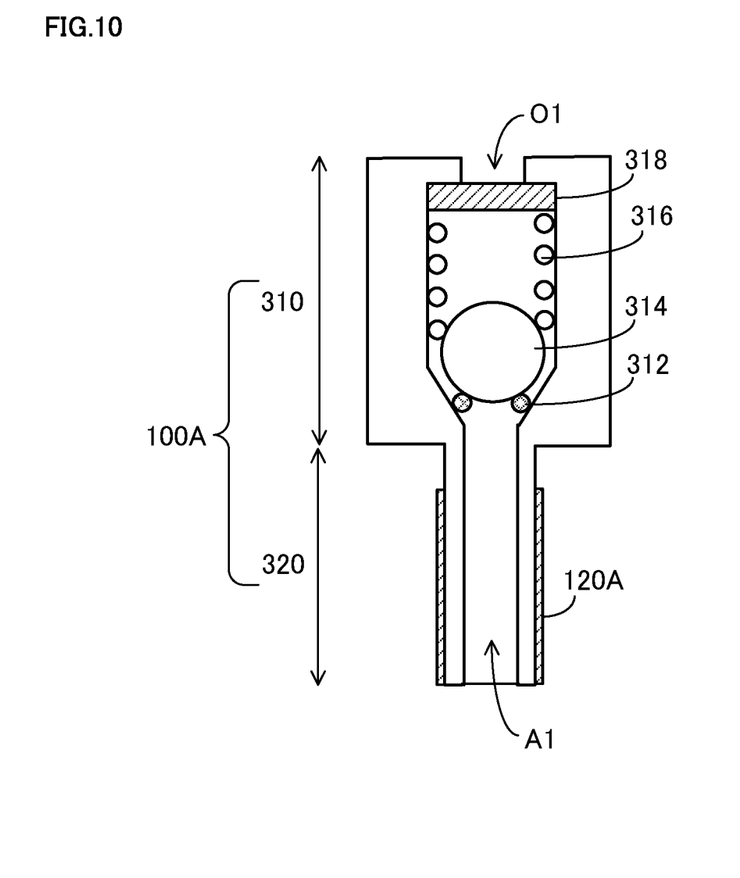
FIG. 10 is a cross-sectional view taken along X-X in FIG. 8.

FIG. 10 is a cross-sectional view taken along X-X in FIG. 8. As shown in FIG. 10, the ventilation passage A1 is formed on the inside of the seal attachment part 320. The ventilation passage A1 directs gas produced inside the storage body 200 to the valve functional part 310, for example.

A valve mechanism constituted to exhaust gas produced inside the storage body 200 (FIG. 1) is provided on the inside of the valve functional part 310. Specifically, the valve functional part 310 includes an O-ring 312, a ball 314, a spring 316, and a membrane 318. That is, a ball spring valve mechanism is provided in the valve functional part 310. Note that the valve mechanism provided within the valve functional part 310 is not particularly restricted as long as pressure within the storage body 200 that has increased due to gas can be reduced, and may, for example, be a poppet valve mechanism, a duckbill valve mechanism, an umbrella valve mechanism, or a diaphragm valve mechanism. Also, the ball 314 need not necessarily be spherical, and may, for example, be hemispherical, prolate-spherical or oblate-spherical. Also, for example, in the case where the ball 314 is hemispherical, a columnar member may extend from the flat surface.

The O-ring 312 is a hollow circular ring, and is constituted by fluorocarbon rubber, for example. The ball 314 and the spring 316 are each constituted by stainless steel, for example. Note that the ball 314 may be constituted by resin. For example, in the case where a battery element (e.g., lithium-ion battery) is stored in the storage body 200, the membrane 318 has a pore diameter of about $10^{-2}$ to $10^0$ μm, and is constituted by a PTFE membrane that is only gas permeable (permselective) and does not leak electrolyte. Note that PTFE stands for polytetrafluoroethylene. Also, the PTFE membrane is a soft material, and thus, in the case where strength is insufficient, a membrane reinforced by integral molding with a nonwoven fabric or a mesh made of polypropylene or polyester can also be used. Also, in the second embodiment, either primary batteries or secondary batteries may be stored in the storage body 200, similarly to the first embodiment. Preferably, secondary batteries are stored in the storage body 200. The type of secondary battery that is stored in the storage body 200 is not particularly restricted, and a lithium-ion battery, a lithium-ion polymer battery, an all-solid battery, a lead battery, a nickel-hydride battery, a nickel-cadmium battery, a nickel-iron battery, a nickel-zinc battery, a silver oxide-zinc battery, a metal air cell, a polyvalent cation battery, a condenser and a capacitor are given as examples.

In a state where the valve device 100A is attached to the storage body 200, and a battery element is stored in the storage body 200, gas directed through the ventilation passage A1 pushes the ball 314 to an exhaust port O1 side when the pressure within the storage body 200 reaches a predetermined pressure. When the ball 314 is pushed and the spring 316 contracts, the gas within the storage body 200 passes through the gap formed between the ball 314 and the O-ring 312, permeates through the membrane 318, and is exhausted to the exterior of the storage body 200 through the exhaust port O1.

As described above, in the valve device 100A according to the second embodiment, the adhesive film 120A adherable to the storage body 200 is adhered in advance to the outer periphery of the valve device main body 110A. Accordingly, with this valve device 100A, the storage body 200 and the valve device 100A can be easily adhered, regardless of the material of the valve device main body 110A. Note that the method for manufacturing the valve device 100A and the method for attaching the valve device 100A to the storage body 200 according to the second embodiment are similar to the valve device 100 according to the first embodiment.

3. Variations

Although first and second embodiments have been described above, the present invention is not limited to the above first and second embodiments, and various modifications can be made without departing from the spirit of the embodiment. Hereinafter, variations will be described.

3-1

In the first embodiment, the cross-section of the adhesion part 112 was configured to be teary eye shaped. However, the cross-sectional shape of the adhesion part 112 is not limited thereto. The cross-sectional shape of the adhesion part 112 may, for example, be circular or polygonal, or may have a shape that is partly curved and partly not curved. That is, a configuration may be adopted in which the cross-sectional shape (outer periphery) of the adhesion part 112 is not curved or is only partly curved.

3-2

Also, in the first and second embodiments, the valve device main bodies 110 and 110A are made of metal. However, the valve device main bodies 110 and 110A need not necessarily be made of metal. For example, the valve device main bodies 110 and 110A may be constituted by a material that does not directly adhere to the storage body 200 by heat sealing, other than metal.

3-3

Also, in the first and second embodiments, the adhesive films 120 and 120A were configured to include a core. However, the adhesive films 120 and 120A need not necessarily include a core.

3-4

Also, in the first and second embodiments, the adhesive films 120 and 120A were configured to respectively adhere to the entire outer periphery of the adhesion parts 112 and 112A. However, the adhesive films 120 and 120A need not necessarily adhere to the entire outer periphery of the adhesion parts 112 and 112A. For example, the adhesive films 120 and 120A may respectively adhere to only part of the outer periphery of the adhesion parts 112 and 112A. Similarly, in this case, the adhesive films 120 and 120A will be adhered to the entire outer periphery of the adhesion parts 112 and 112A, due to the valve devices 100 and 100A and the storage body 200 being heat sealed.

3-5

Also, in the first and second embodiments, the adhesive films 120 and 120A are prepared separately to the valve device main bodies 110 and 110A as the adhesive member, and the valve devices 100 and 100A are constituted with these adhesive films 120 and 120A adhered to the entire outer periphery of the adhesion parts 112 and 112A of the valve device main bodies 110 and 110A. However, it is also possible to constitute a valve device having a profile cross-sectional shape such as shown in FIGS. 3 and 9, for example, by pouring an adhesive resin that achieves adhesiveness equivalent to the adhesive films 120 and 120A around the entire outer periphery of the adhesion parts 112 and 112A of the valve device main bodies 110 and 110A. Similarly, in this case, a layer that is constituted by the adhesive resin serving as the adhesive member will adhere to the heat-sealable resin layer serving as the inner layer of the storage body 200, by heat sealing the valve devices 100 and 100A and the storage body 200.

3-6

Also, in the first and second embodiments, a first iteration of heat sealing (primary heat sealing) in a state where the valve devices 100 and 100A are sandwiched in the flange part of the storage body 200 and a second iteration of heat sealing (secondary heat sealing) for further strengthening the seal around the valve devices 100 and 100A are performed as the procedure for attaching the valve devices 100 and 100A to the storage body 200, but it is also possible to attach the valve devices 100 and 100A to the storage body 200, by strongly heat sealing the periphery of the valve devices 100 and 100A with only a first iteration of heat sealing (primary heat sealing). Furthermore, although welding by a heat sealing method is performed, adhesion need only be achieved by melting the resin through application of heat, and thus a method such as ultrasonic sealing or induction heat sealing may be employed.

REFERENCE SIGNS LIST 100, 100A Valve device
110, 110A Valve device main body
112, 112A Adhesion part
113 Circular part
114, 115 Wing-like protruding end part
120, 120A Adhesive film
130 Primary sealed part
132 Secondary sealed part
200 Storage body
310 Valve functional part
320 Seal attachment part
A1 Ventilation passage
H1 Ventilation port
O1 Exhaust port

The invention claimed is:

1. A valve device for attaching to a storage body, comprising:
   a valve device main body configured to reduce pressure inside the storage body in a case where the pressure increases due to gas produced inside the storage body; and
   an adhesive member adhered to an outer periphery of the valve device main body, and configured to adhere to the storage body,
   wherein a hole through which the gas passes is formed in an end face of the valve device main body, wherein, in plan view, a length of the adhesive member in a width direction is longer than a length of a region of the valve device main body where the adhesive member is adhered in a width direction.

2. The valve device according to claim 1, wherein the valve device main body is made of metal.

3. The valve device according to claim 1, wherein the adhesive member is in film form.

4. The valve device according to claim 1, wherein at least part of a region of the outer periphery of the valve device main body where the adhesive member is adhered is curved.

5. The valve device according to claim 1, wherein the adhesive member includes a core.

6. The valve device according to claim 1, wherein the adhesive member is adhered to the outer periphery of the valve device main body in a position that does not cover the hole.

7. The valve device according to claim 1,
   wherein the valve device main body includes:
   a first portion inside of which is formed a valve mechanism for reducing pressure inside the storage body in a case where the pressure increases due to gas produced inside the storage body; and
   a second portion inside of which is formed a ventilation passage for directing gas produced inside the storage body to the valve mechanism, and
   a step is formed at a boundary between the first portion and the second portion.

8. The valve device according to claim 1, wherein a cross-sectional shape of the region of the valve device main body where the adhesive member is adhered is a teary eye shape having a circular part and a wing-like protruding end part extending from both horizontal ends of the circular part.

9. A storage body comprising the valve device according to claim 1.

10. A power storage device comprising:
    a battery element;
    a storage body accommodating the battery element; and
    a valve device attached to the storage body,
    wherein the valve device includes:
    a valve device main body configured to reduce pressure inside the storage body in a case where the pressure increases due to gas produced inside the storage body; and
    an adhesive member adhered to an outer periphery of the valve device main body, and adhered to the storage body, and
    a hole through which the gas passes is formed in an end face of the valve device main body, wherein, in plan view, a length of the adhesive member in a width direction is longer than a length of a region of the valve device main body where the adhesive member is adhered in a width direction.

11. A method for attaching a valve device to a storage body, the valve device including a valve device main body configured to reduce pressure inside the storage body in a case where the pressure increases due to gas produced inside the storage body, and an adhesive member adhered to an outer periphery of the valve device main body and configured to adhere to the storage body, and a hole through which the gas passes being formed in an end face of the valve device main body, the valve device attachment method comprising the steps of:
    sandwiching the valve device with the storage body; and
    thermally sealing a region of the storage body where the valve device is sandwiched, wherein, in plan view, a length of the adhesive member in a width direction is longer than a length of a region of the valve device main body where the adhesive member is adhered in a width direction.

* * * * *